United States Patent
Pai et al.

(10) Patent No.: US 10,585,542 B1
(45) Date of Patent: Mar. 10, 2020

(54) CAPACITIVE TOUCH SENSOR

(71) Applicants: Chih-Chiang Pai, Taoyuan (TW); Meng-Kuei Lin, Taoyuan (TW); Chin-Fong Lin, Taoyuan (TW); Li-Yeh Yang, Taoyuan (TW); Chiu-Wen Chen, Taoyuan (TW); Txu-Yen Liu, Taoyuan (TW); Chun-Hao Huang, Taoyuan (TW)

(72) Inventors: Chih-Chiang Pai, Taoyuan (TW); Meng-Kuei Lin, Taoyuan (TW); Chin-Fong Lin, Taoyuan (TW); Li-Yeh Yang, Taoyuan (TW); Chiu-Wen Chen, Taoyuan (TW); Txu-Yen Liu, Taoyuan (TW); Chun-Hao Huang, Taoyuan (TW)

(73) Assignee: YOUNG FAST OPTOELECTRONICS CO., LTD., Taoyuan (TW)

( * ) Notice: Subject to any disclaimer, the term of this patent is extended or adjusted under 35 U.S.C. 154(b) by 0 days.

(21) Appl. No.: 16/202,063

(22) Filed: Nov. 27, 2018

(51) Int. Cl.
G06F 3/044 (2006.01)
G06F 3/047 (2006.01)
G06F 3/042 (2006.01)

(52) U.S. Cl.
CPC ............. G06F 3/044 (2013.01); G06F 3/047 (2013.01); G06F 3/0421 (2013.01)

(58) Field of Classification Search
CPC .......... G06F 3/044; G06F 3/0421; G06F 3/047
See application file for complete search history.

(56) References Cited

U.S. PATENT DOCUMENTS

| | | | |
|---|---|---|---|
| 2012/0319966 A1* | 12/2012 | Reynolds | G06F 3/041 345/173 |
| 2015/0122623 A1* | 5/2015 | Kim | H03K 17/9618 200/5 R |
| 2015/0227230 A1* | 8/2015 | Cok | G06F 3/044 345/174 |
| 2016/0179229 A1* | 6/2016 | Ahn | G06F 3/041 345/173 |
| 2017/0153753 A1* | 6/2017 | Ishizaki | G06F 3/044 |

* cited by examiner

Primary Examiner — Dmitriy Bolotin

(57) ABSTRACT

A touch sensor includes an insulative substrate; a first sensing layer, having first sensing strings arranged along a first axis, and a first interval being disposed between every two adjacent first sensing strings; and a second sensing layer, having line paths arranged along a second axis, and a second interval being disposed between every two adjacent line paths. A plurality of the line paths composes a second sensing string. Each second sensing string has an active unit and an inactive unit. The active unit is formed by one or more line paths connected by a crossing line. The line paths of the inactive units are connected to a ground line. The first sensing strings and the second sensing strings are separately orthogonally arranged on two opposite sides of the substrate. The second interval is less than the first interval in width.

17 Claims, 11 Drawing Sheets

CAPACITIVE TOUCH SENSOR

BACKGROUND OF THE INVENTION

1. Technical Field

The invention relates to touch sensors, particularly to transparent capacitive touch sensors.

2. Related Art

A conventional capacitive touch sensor includes an x-axis sensing layer and a y-axis sensing layer, which are insulatively attached on two opposite sides of a substrate. These two sensing layers are separately provided with required electrode patterns, for example, a plurality of x-axis sensing strings and y-axis sensing strings. An interval with a proper width is formed between every two adjacent sensing strings to keep insulation. The sensing strings are connected to a control circuit to sense a capacitive effect which is caused by touches of finger or conductor.

In the abovementioned structure of touch sensor, to guarantee insulation between two adjacent sensing strings, the interval between two adjacent sensing strings must be widened. However, the widened intervals are easy to suffer external electromagnetic interference (EMI) or radio-frequency interference (RFI). Even a touch sensor cannot function completely if such interference is too serious. In addition, the sensing strings are different from the intervals in light permissibility, so a touch sensor with a widened intervals tends to cause blur, distortion or even a moiré pattern of image shown on a display under the touch sensor because of optical interference and diffraction. This seriously reduces image quality.

SUMMARY OF THE INVENTION

An object of the invention is to provide a capacitive touch sensor, which can form electromagnetic shielding to isolate EMI and RFI without complicating the manufacturing process and increasing manufacturing cost to avoid optical interference to increase optical uniformity.

Another object of the invention is to provide a capacitive touch sensor, which can adjust an effective area of capacitive electrode without changing an electrode pattern of the sensing layer to meet customers' requirements.

To accomplish the above objects, the capacitive touch sensor of the invention includes an insulative substrate; a first sensing layer, made of a conductive material, having first sensing strings which are arranged along a first axis without superposition, a first interval being disposed between every two adjacent first sensing strings by removing the conductive material to form isolation, an end of each of the first sensing strings being provided with a first contact, and each of the first contacts being electrically connected to a first communication contact through a first transmission line; and a second sensing layer, made of a conductive material, having line paths which are formed by the conductive material and arranged along a second axis without superposition, a second interval being disposed between every two adjacent line paths by removing the conductive material to form isolation, a plurality of the line paths composing a second sensing string. Each of the second sensing strings has an active unit and an inactive unit. The active unit is formed by one or more line paths electrically connected by a crossing line. The line paths of the inactive units are connected to a ground line. The first sensing strings and the second sensing strings are separately orthogonally arranged on two opposite sides and second side of the substrate. The second interval is less than the first interval in width.

Capacitive touch signals captured by the first and second sensing layers can be transmitted to a signal processor through the first and second communication contacts. The second interval is less than the first interval in width, so the intervals on the second sensing layer are very narrow to provide an EMI shielding effect and increase optical uniformity. In addition, the number of the line paths which are connected by one of the crossing lines can be adjusted to change an effective area of capacitive electrode to meet customers' requirements.

In an embodiment, one or more of the line paths are connected by a crossing line to form a second sensing string and no line path is connected to the ground line.

In an embodiment, a cover plate is disposed on the first sensing layer, a cover film is disposed on the second sensing layer for protection, a colored frame formed by an insulative material is provided on the periphery of the cover plate, the colored frame defines a visible area and a shaded area around the visible area, both the first sensing strings and the second sensing strings are located within the visible area, and the first contacts, the first transmission lines, the first communication contacts, the crossing lines, the second transmission lines and the second communication contacts are located within the shaded area.

In an embodiment, two longitudinal edges of the second interval are symmetrical lines, and the two longitudinal edges are straight lines, waved lines or zigzag lines, but not limited to these. Preferably, a width of the second interval is less than 100 μm. More preferably, a width of the second interval is less than 25 μm.

In an embodiment, the conductive material of the first and second sensing layers is metal oxide or graphene. The metal oxide is indium tin oxide (ITO), indium zinc oxide IZO), aluminum zinc oxide (AZO) or antimony tin oxide (ATO), but not limited to these.

In an embodiment, the substrate, the cover plate and the cover film are made of glass, polymethyl methacrylate (PMMA), polycarbonate (PC), polyester (PET), cyclic olefin copolymer (COC) or cyclic olefin polymer (COP), but not limited to these.

In an embodiment, a function film is added. The function film is formed by an anti-fingerprint layer, an atomization film, a hard coating layer, a polarizing film, a retardation film or an optical isotropic film or a lamination of two or more thereof, but not limited to these.

DETAILED DESCRIPTION OF THE INVENTION

Figure 1:
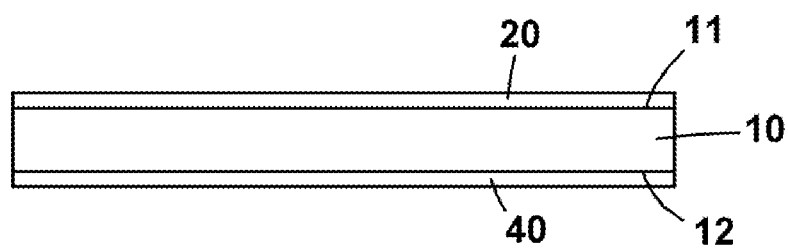
FIG. 1 is a schematic view showing a laminated structure of the first embodiment of the invention.
Figure 2:
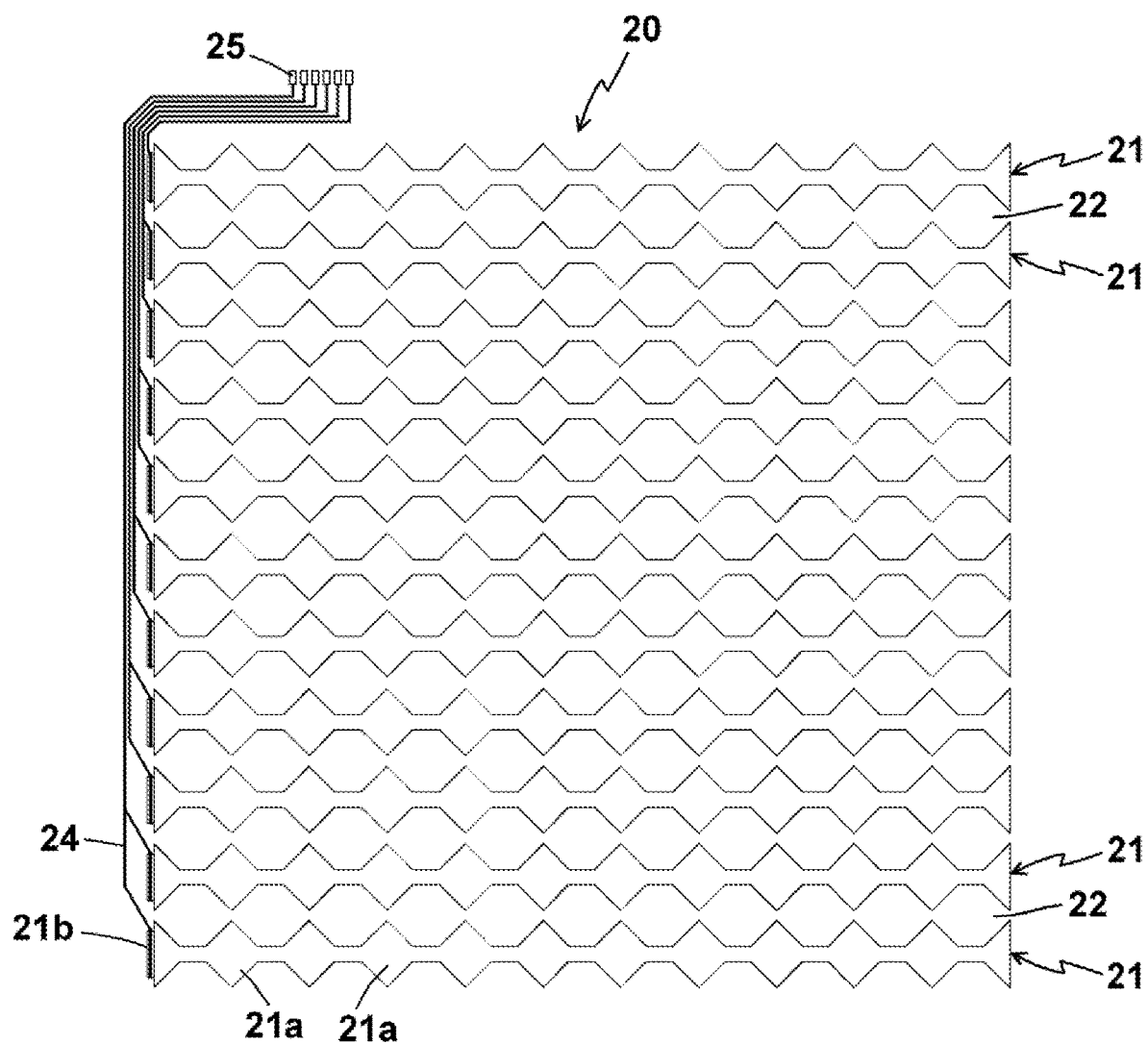
FIG. 2 is a plan view of the first sensing layer of the first embodiment of the invention.

FIGS. 1-4 depict a capacitive touch sensor of the first embodiment of the invention, which mainly includes a substrate 10, a first sensing layer 20 and a second sensing layer 40.

The substrate 10 is made of an insulative material with high light permissibility, such as glass. The substrate 10 has a first side 11 and a second side 12, which are flat and opposite.

The first sensing layer 20 is made of a conductive material with high light permissibility, such as an indium tin oxide (ITO) film. Please refer to FIG. 2. The first sensing layer 20 in this embodiment is an x-axis sensing layer and disposed on the first side 11 of the substrate 10. The first sensing layer 20 has first sensing strings 21 (i.e. x-axis sensing strings) which are arranged along an x-axis without superposition. Each of the first sensing strings 21 is composed of a plurality of rhombic first capacitive sensing unit 21a arranged along a first direction (i.e. x-axis) in series. The conductive material between every two adjacent first sensing strings 21 is removed to form intervals 22. Each of the intervals 22 isolates two adjacent first sensing strings 21. An end of each of the first sensing strings 21 is provided with a first contact 21b. Each of the first contacts 21b is electrically connected to a first communication contact 25 through a first transmission line 24.

The second sensing layer 40 is made of a conductive material with high light permissibility, such as an indium tin oxide (ITO) film. Please refer to FIG. 3. The second sensing layer 40 in this embodiment is a y-axis sensing layer and disposed on the second side 12 of the substrate 10. There are line paths 41 which are formed by the conductive material and arranged along a y-axis without superposition on the second sensing layer 40. A second interval 42 is disposed between every two adjacent line paths 41 by removing the conductive material to form isolation. In this embodiment, three line paths 41 compose a second sensing string 48. Each of the second sensing strings 48 includes an active unit 48a and an inactive unit 48b. The active unit 48 is formed by two adjacent line paths 41 electrically connected by a crossing line 43. Each of the crossing lines 43 is electrically connected to a second communication contact 45 through a second transmission line 44. The line paths 41 of the inactive units 48b are connected to a ground line 46.

Figure 4:
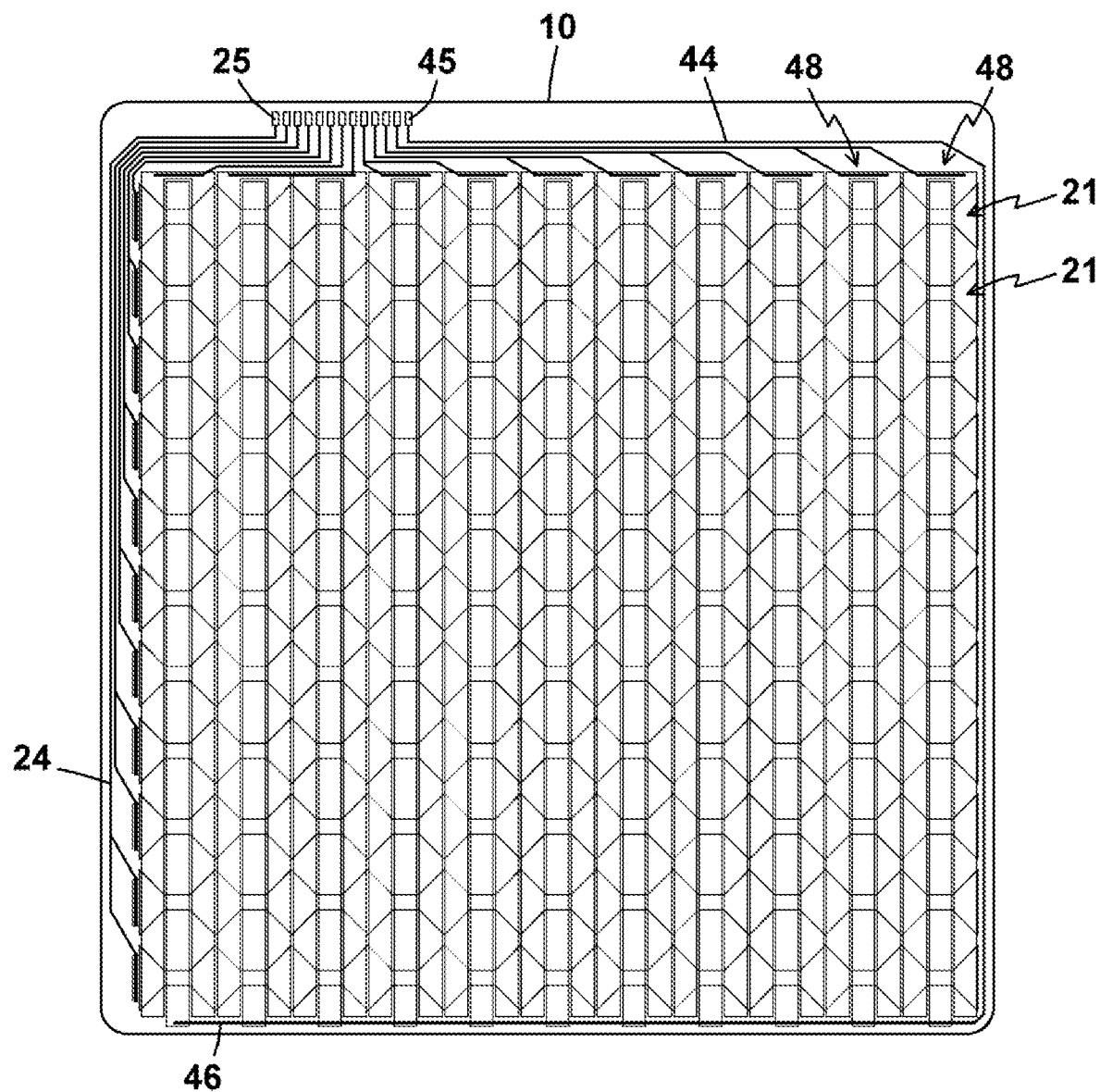
FIG. 4 is a plan view of the two sensing layers of the first embodiment of the invention.

As shown in FIGS. 1 and 4, the first sensing strings 21 and the second sensing strings 48 are insulatively separate and orthogonally disposed on two opposite sides 11, 12 of the substrate 10. As a result, junctions of the two sensing strings 21, 48 form capacitive touch sensing points, from which capacitive touch signals are captured can be transmitted to a signal processor (not shown) through a flat cable (not shown) connected to the communication contacts 24, 45.

Further, the second interval 42 is less than the first interval 22 in width. It is preferred that the width of the second interval 42 is configured to be as narrow as possible under a precondition of keeping isolation of two adjacent line paths 41. For example, the width is less than 100 μm so that the area of removing the conductive material can be effectively reduced to provide an EMI shielding effect. Meanwhile, the reduced insulative area can also increase optical uniformity of refractive index to improve visibility of a whole touch screen.

Figure 3:
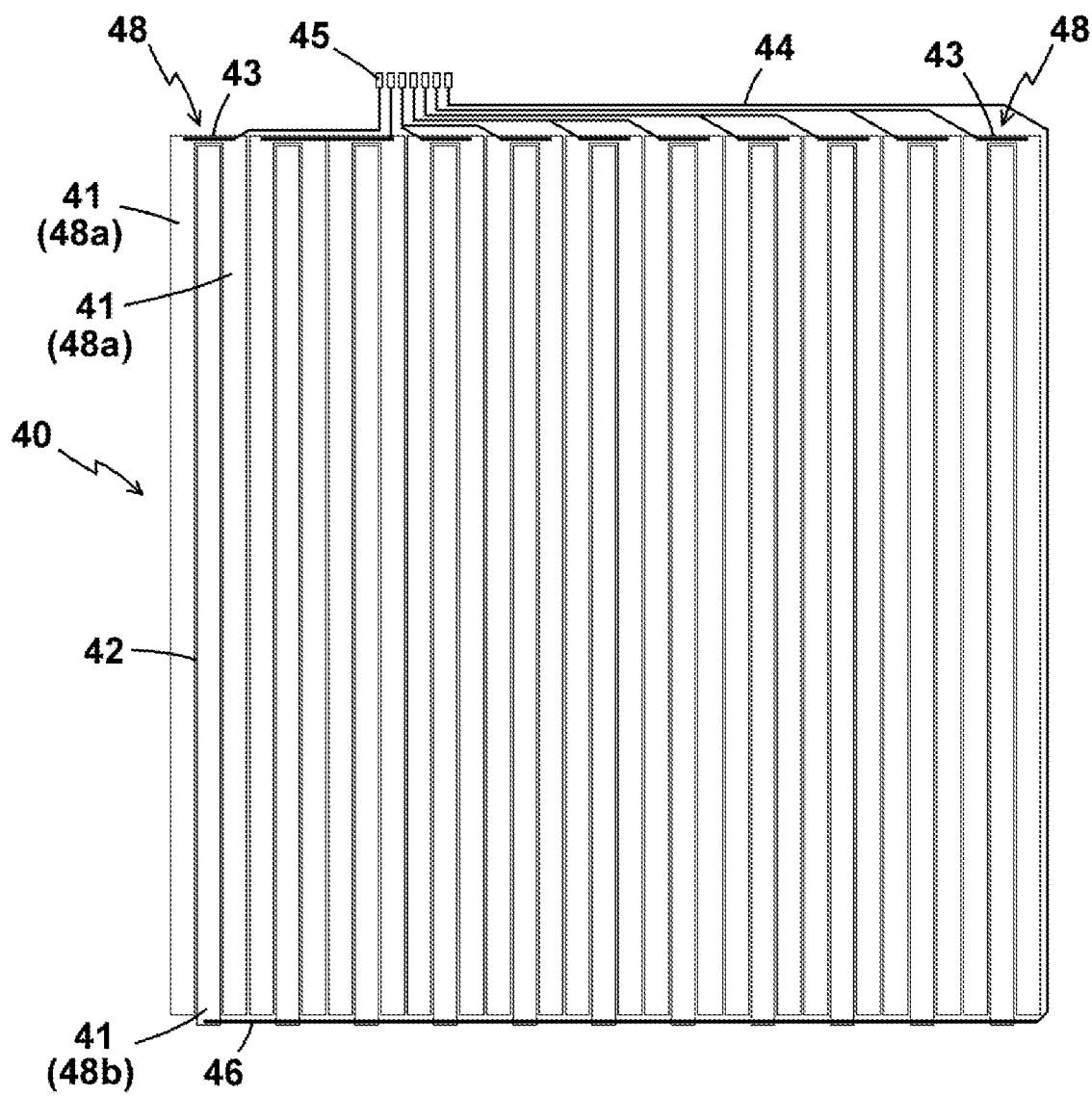
FIG. 3 is a plan view of the second sensing layer of the first embodiment of the invention.
Figure 5:
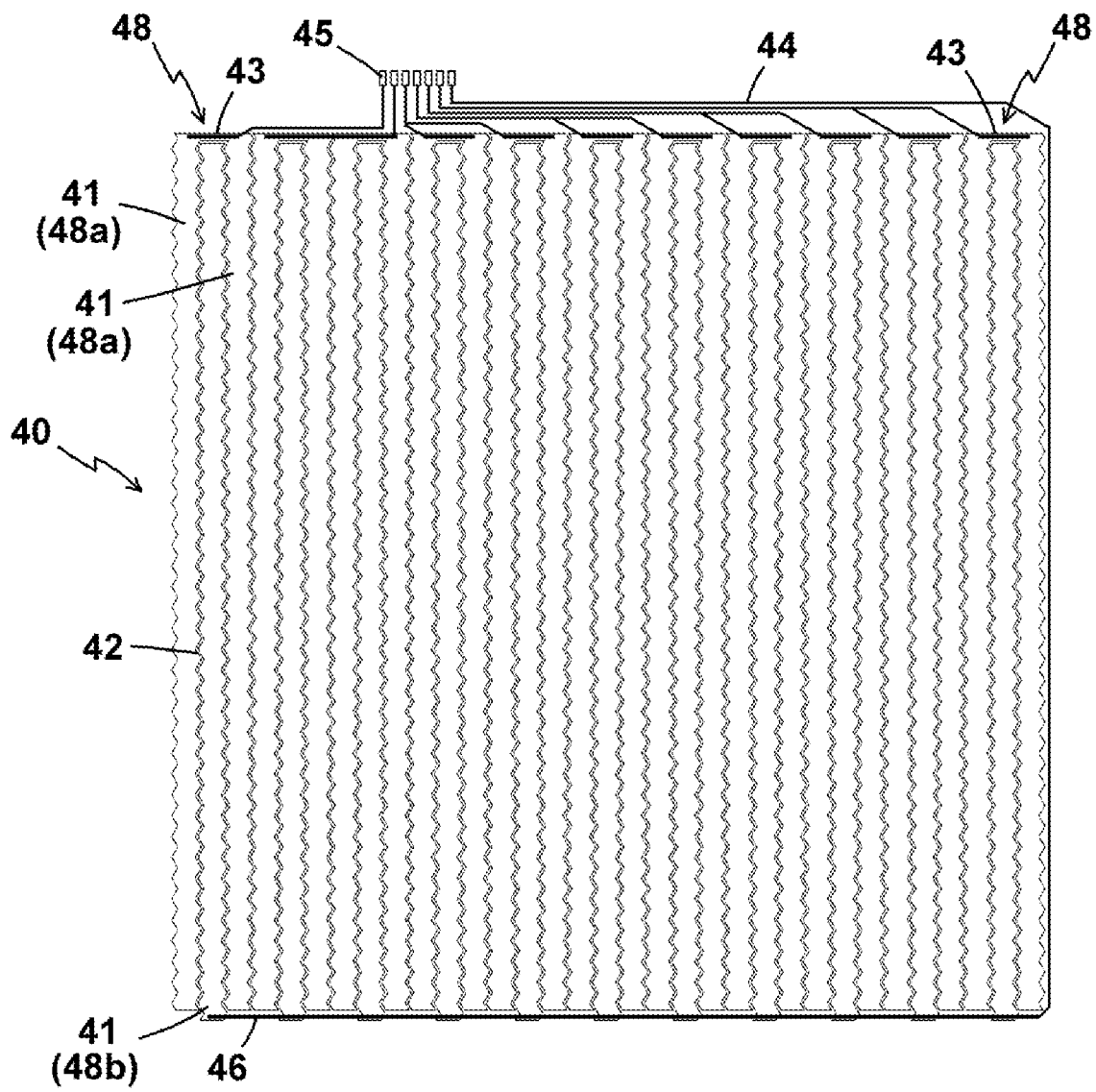
FIG. 5 is a plane view of the second sensing layer of the second embodiment of the invention, which shows edges of the second interval are configured to be of a zigzag shape.
Figure 6:
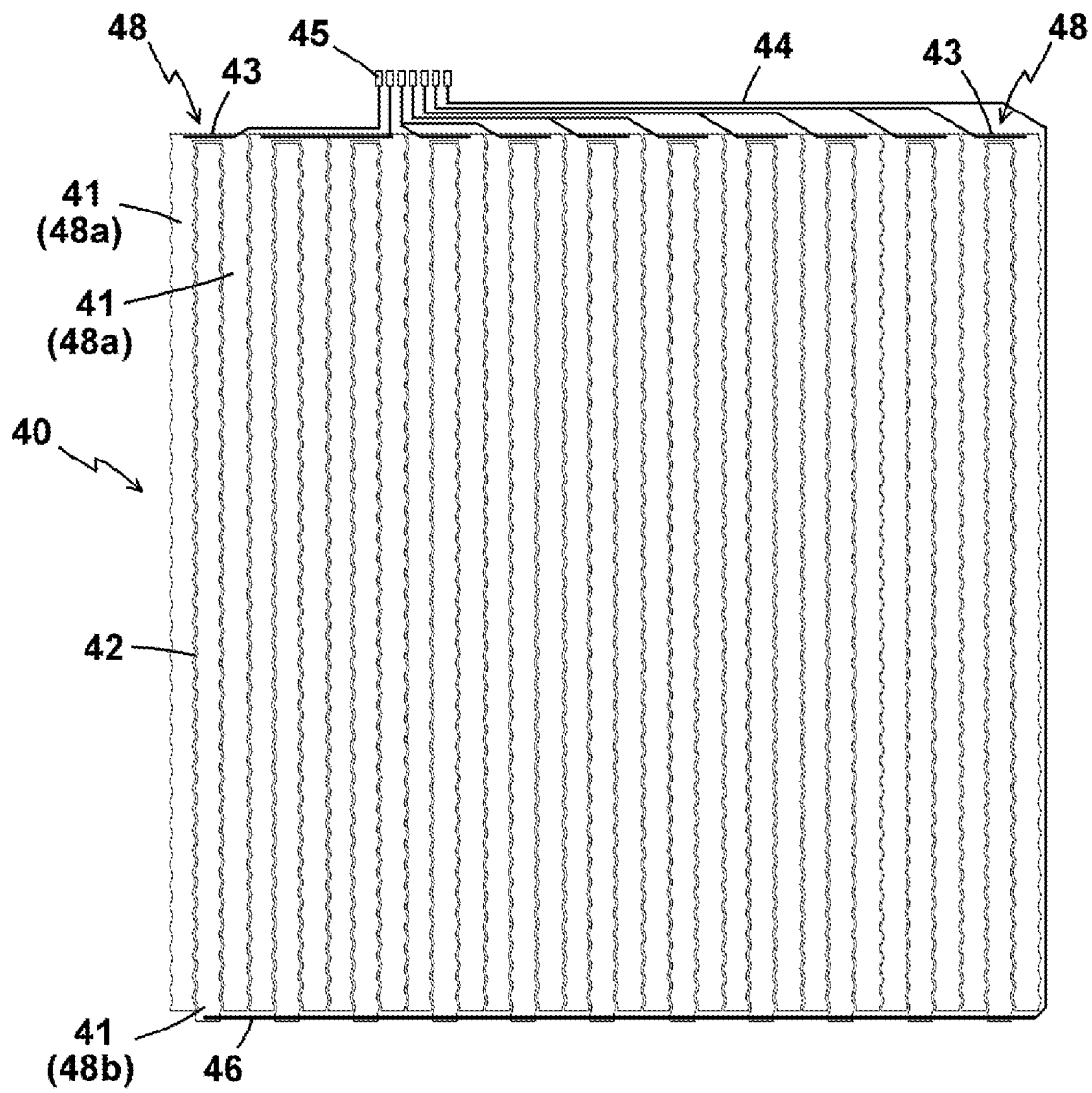
FIG. 6 is a plane view of the second sensing layer of the third embodiment of the invention, which shows edges of the second interval are configured to be of a waved shape.

In addition, as shown in FIG. 3, in this embodiment, two longitudinal edges of the second interval 42 are two continuous straight lines. However, such a transparent touch sensor is usually disposed on a liquid crystal display, so the second intervals 42 with straight edges may cause a moire pattern to reduce image quality. To avoid such a moire pattern, two edges of the second interval 42 may be configured to be zigzag lines (the second embodiment as shown in FIG. 5), waved lines (the third embodiment as shown in FIG. 6) or any other regular or irregular continuous lines. This can prevent or reduce optical interference.

Figure 7:
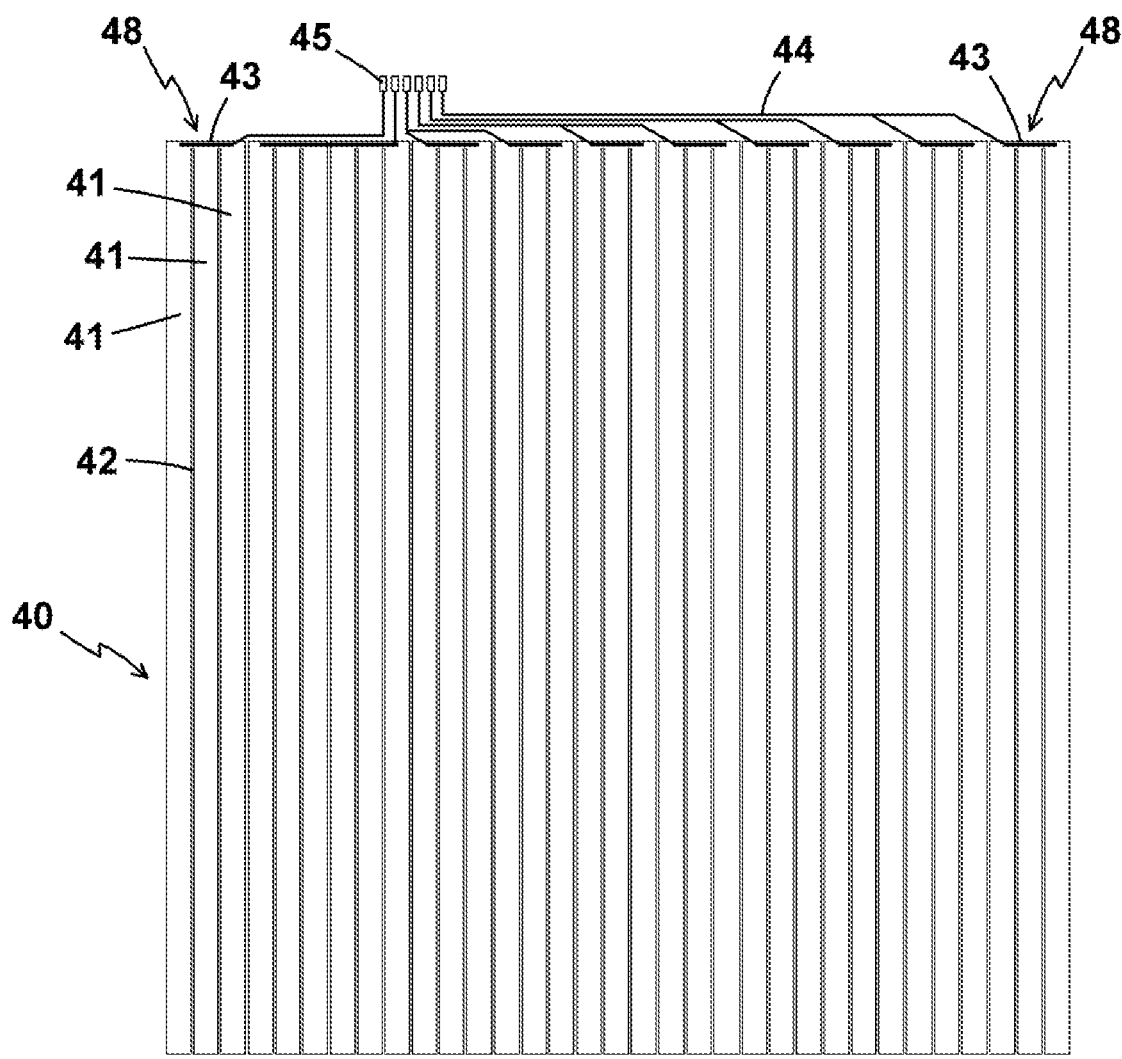
FIG. 7 is a plane view of the second sensing layer of the fourth embodiment of the invention, which shows another wiring arrangement of the line paths of the second sensing strings.

Also, the number of the line paths 41 which are connected by one of the crossing lines 41 can be increased or decreased to change an effective area of capacitive electrode of the second sensing strings 48 to meet customers' requirements. For example, in this embodiment, three line paths 41 compose a second sensing string 48 and the crossing line 43 electrically connects two line paths 41 as shown in FIG. 3. However, when the crossing line 43 connects three adjacent line paths 41 (the fourth embodiment as shown in FIG. 7), the effective area of capacitive electrode of the second sensing string 48 can be increased. In this embodiment, no line path is connected to the ground line 46. On the contrary, when the crossing line 43 connects only one line path 41, the effective area of capacitive electrode of the second sensing string 48 can be decreased and the other two line paths are connected to the ground line 46. On the other hand, in this embodiment, a second sensing string 48 is composed of three line paths 41, but not limited to this. The second sensing string 48 may be composed of more or less than three line paths 41. And the line paths 41 on the second sensing layer 40 may be configured to be narrower in width to make each of the second sensing strings 48 may include more line paths 41. This will be advantageous to adjusting the effective area of capacitive electrode of the second sensing strings 48. In sum, the second sensing layer 40 of the invention allows the effective area of capacitive electrode of the second sensing strings 48 to be adjusted by changing the number of the line paths 41 connected by the crossing line 41 to meet customers' requirement without modifying the electrode pattern of the sensing layers 20, 40.

Figure 8:
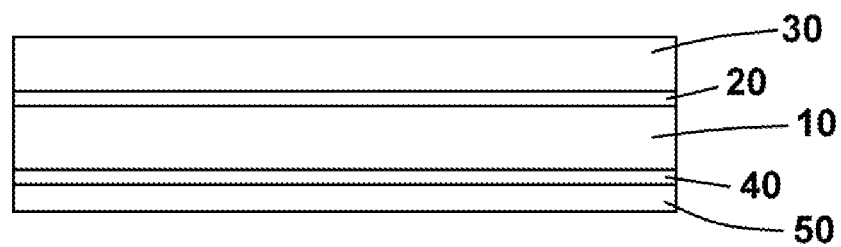
FIG. 8 is a schematic view showing a laminated structure of the fifth embodiment of the invention.

FIG. 8 depicts a laminated structure of the fifth embodiment of the invention, which mainly includes a substrate 10, a first sensing layer 20, a cover plate 30, a second sensing layer 40 and a cover film 50.

The substrate 10 is made of an insulative material with high light permissibility, such as glass. The substrate 10 has a first side 11 and a second side 12, which are flat and opposite.

The first sensing layer 20 is made of a conductive material with high light permissibility, such as an indium tin oxide (ITO) film. Please refer to FIG. 2. The first sensing layer 20 in this embodiment is an x-axis sensing layer and disposed on the first side 11 of the substrate 10. The first sensing layer 20 has first sensing strings 21 (i.e. x-axis sensing strings) which are arranged along an x-axis without superposition. Each of the first sensing strings 21 is composed of a plurality of rhombic first capacitive sensing unit 21a arranged along a first direction (i.e. x-axis) in series. The conductive material between every two adjacent first sensing strings 21 is removed to form intervals 22. Each of the intervals 22 isolates two adjacent first sensing strings 21. An end of each of the first sensing strings 21 is provided with a first contact 21b. Each of the first contacts 21b is electrically connected to a first communication contact 25 through a first transmission line 24.

Figure 9:
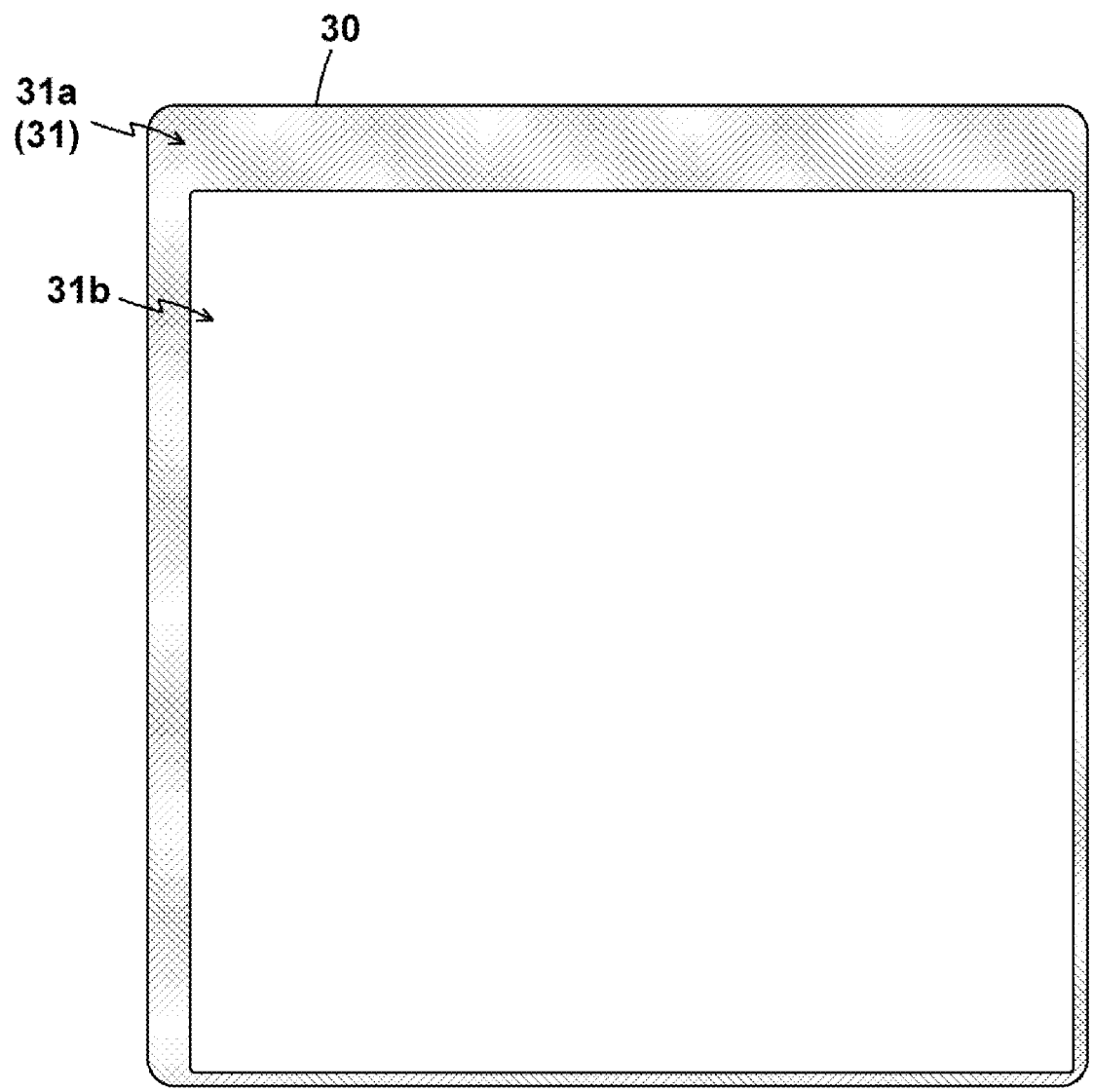
FIG. 9 is a plane view of the cover plate of the fifth embodiment of the invention.

Please refer to FIG. 9, the cover plate 30 is made of an insulative material with great mechanical strength and high light permissibility, such as glass. The cover plate 30 is disposed on the first sensing layer 20. A colored frame 31 formed by an insulative material is provided on the periphery of the cover plate 30. The colored frame 31 defines a visible area 31b and a shaded area 31a around the visible area 31b.

The second sensing layer 40 is made of a conductive material with high light permissibility, such as an indium tin oxide (ITO) film. Please refer to FIG. 3. The second sensing layer 40 in this embodiment is a y-axis sensing layer and disposed on the second side 12 of the substrate 10. There are line paths 41 which are formed by the conductive material and arranged along a y-axis without superposition on the second sensing layer 40. A second interval 42 is disposed between every two adjacent line paths 41 by removing the conductive material to form isolation. In this embodiment, three line paths 41 compose a second sensing string 48. The second sensing string 48 is formed by three adjacent line paths 41 electrically connected by a crossing line 43. Each of the crossing lines 43 is electrically connected to a second communication contact 45 through a second transmission line 44.

The cover film 50 is made of an insulative material with high light permissibility, such as polyester film. The cover plate 50 is disposed on the second sensing layer 40 for protection.

Figure 10:
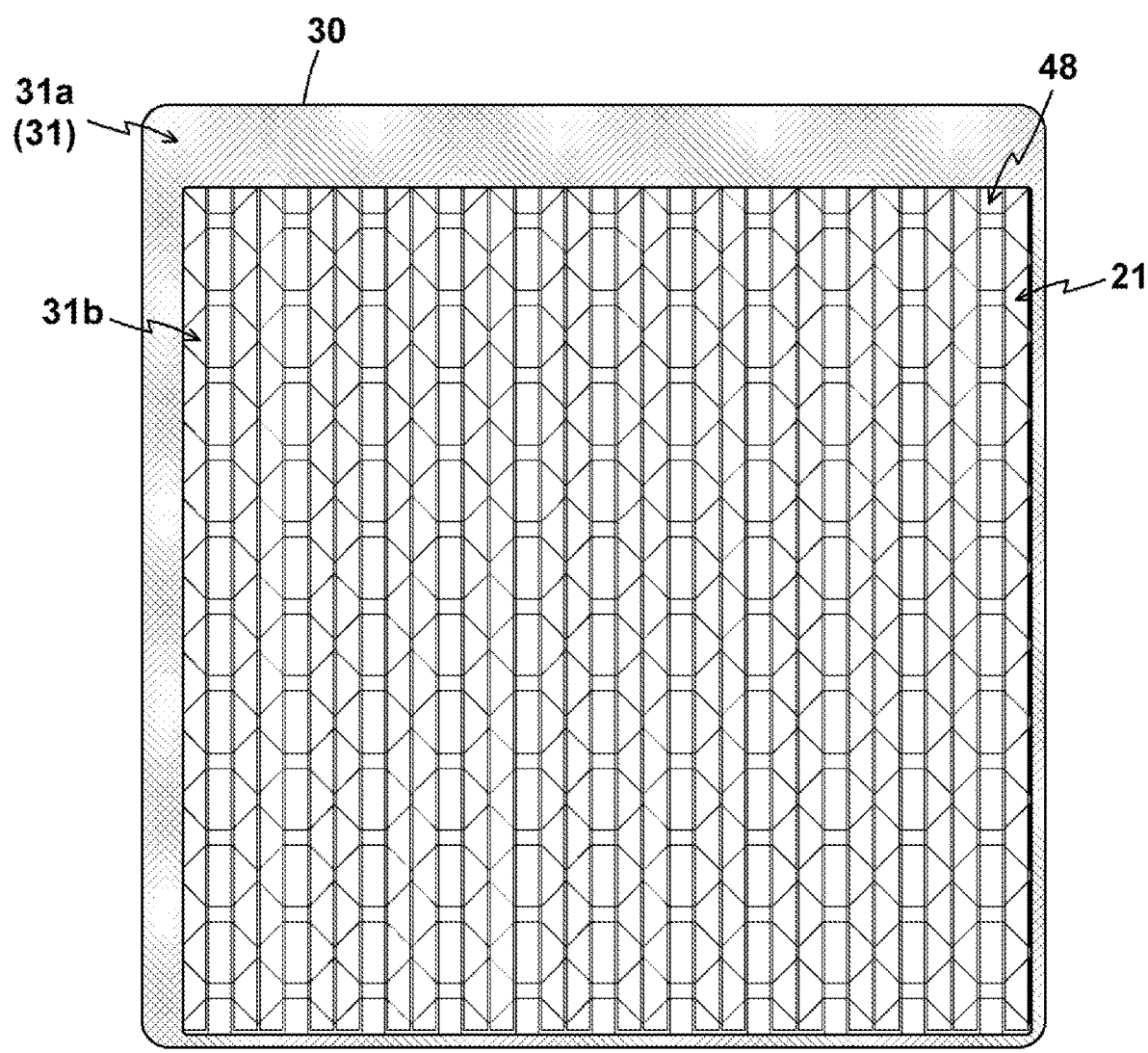
FIG. 10 is a plan view of the two sensing layers of the fifth embodiment of the invention.

In addition, the cover plate 30 and the cover film 50 can be respectively adhered on the sensing layers 20, 40 by optical clear adhesive (OCA) or optical clear resin (OCR) with high light permissibility and insulativity. Please refer to FIG. 10. Both the first sensing strings 41 and the second sensing strings 48 are located within the visible area 31b, and the first contacts 21b, the first transmission lines 24, the first communication contacts 25, the crossing lines 43, the second transmission lines 44 and the second communication contacts 45 are located within the shaded area 31a to avoid affecting overall appearances of a transparent touch sensor.

In this embodiment, as the first embodiment, the first sensing strings 21 are orthogonally arranged on two opposite sides of the substrate 10, the second interval 42 is less than the first interval 22 in width, and the width of the second interval 42 is less than 100 μm so that the second sensing layer 20 can provide an EMI shielding effect and increase optical uniformity of refractive index. Two longitudinal edges of the second interval 42 are symmetrical or asymmetrical lines, for example, straight lines, waved lines, zigzag lines, regular or irregular lines to reduce optical interference. The number of the line paths 41 which are connected by one of the crossing lines 43 can be adjusted to change an effective area of capacitive electrode to meet customers' requirements.

Figure 11:
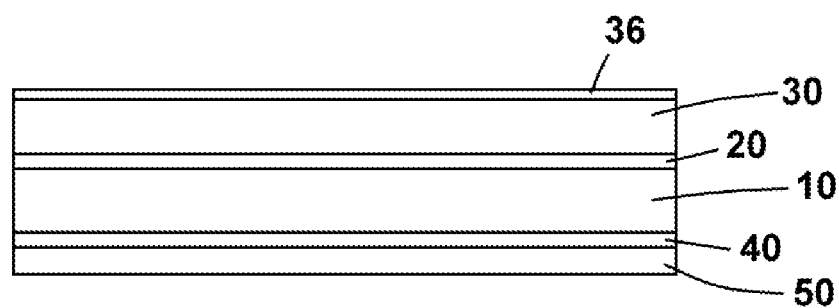
FIG. 11 is a schematic view showing a laminated structure of the sixth embodiment of the invention.

Moreover, the cover plate 30 can be further provided with a function film 36 (the sixth embodiment as shown in FIG. 11). The function film 36 may be an anti-fingerprint layer, an atomization film or a hard coating layer to reduce reflectivity of a touch screen or increase hardness and wear resistance thereof. The function film 36 may also be a film with optical adjustment property, such as a polarizing film, a retardation film or an optical isotropic film or a lamination of two or more thereof. Thus visibility of the touch sensor can be improved.

What is claimed is:

1. A capacitive touch sensor comprising:
    a substrate, made of an insulative material with light permissibility, and having a first side and a second side;
    a first sensing layer, made of a conductive material with light permissibility, disposed on the first side of the substrate, having first sensing strings which are arranged along a first axis without superposition, wherein a first interval is disposed between every two adjacent first sensing strings by removing the conductive material to form isolation, an end of each of the first sensing strings is provided with a first contact, and each of the first contacts is electrically connected to a first communication contact through a first transmission line; and
    a second sensing layer, made of a conductive material with light permissibility, disposed on the second side of the substrate, having line paths which are formed by the conductive material and arranged along a second axis without superposition, wherein a second interval is disposed between every two adjacent line paths by removing the conductive material to form isolation, a plurality of the line paths composes a second sensing string, each of the second sensing strings comprises an active unit and an inactive unit, the active unit is formed by one or more line paths electrically connected by a crossing line, each of the crossing lines is electrically connected to a second communication contact through a second transmission line, and the line paths of the inactive units are connected to a ground line;
    wherein the first sensing strings and the second sensing strings are separately orthogonally arranged on the first side and second side of the substrate, and the second interval is less than the first interval in width.

2. The capacitive touch sensor of claim 1, wherein two longitudinal edges of the second interval are symmetrical lines.

3. The capacitive touch sensor of claim 2, wherein the two longitudinal edges are straight lines, waved lines or zigzag lines.

4. The capacitive touch sensor of claim 1, wherein a width of the second interval is less than 100 μm.

5. A capacitive touch sensor comprising:
    a substrate, made of an insulative material with light permissibility, and having a first side and a second side;
    a first sensing layer, made of a conductive material with light permissibility, disposed on the first side of the substrate, having first sensing strings which are arranged along a first axis without superposition, wherein a first interval is disposed between every two adjacent first sensing strings by removing the conductive material to form isolation, an end of each of the first sensing strings is provided with a first contact, and each of the first contacts is electrically connected to a first communication contact through a first transmission line; and
    a second sensing layer, made of a conductive material with light permissibility, disposed on the second side of the substrate, having line paths which are formed by the conductive material and arranged along a second axis without superposition, wherein a second interval is disposed between every two adjacent line paths by removing the conductive material to form isolation, one or more of the line paths are electrically connected by a crossing line to form a second sensing string, and each of the crossing lines is electrically connected to a second communication contact through a second transmission line;

wherein the first sensing strings and the second sensing strings are separately orthogonally arranged on the first side and second side of the substrate, and the second interval is less than the first interval in width.

6. The capacitive touch sensor of claim 5, wherein two longitudinal edges of the second interval are symmetrical lines.

7. The capacitive touch sensor of claim 6, wherein the two longitudinal edges are straight lines, waved lines or zigzag lines.

8. The capacitive touch sensor of claim 5, wherein a width of the second interval is less than 100 μm.

9. A capacitive touch sensor comprising:
   a substrate, made of an insulative material with light permissibility, and having a first side and a second side;
   a first sensing layer, made of a conductive material with light permissibility, disposed on the first side of the substrate, having first sensing strings which are arranged along a first axis without superposition, wherein a first interval is disposed between every two adjacent first sensing strings by removing the conductive material to form isolation, an end of each of the first sensing strings is provided with a first contact, and each of the first contacts is electrically connected to a first communication contact through a first transmission line;
   a cover plate, made of an insulative material with light permissibility, disposed on the first sensing layer, wherein a colored frame formed by an insulative material is provided on a periphery of the cover plate, and the colored frame defines a visible area and a shaded area around the visible area;
   a second sensing layer, made of a conductive material with light permissibility, disposed on the second side of the substrate, having line paths which are formed by the conductive material and arranged along a second axis without superposition, wherein a second interval is disposed between every two adjacent line paths by removing the conductive material to form isolation, one or more of the line paths are electrically connected by a crossing line to form a second sensing string, and each of the crossing lines is electrically connected to a second communication contact through a second transmission line; and
   a cover film, made of an insulative material with light permissibility, and disposed on the second sensing layer,
   wherein the first sensing strings and the second sensing strings are separately orthogonally arranged on the first side and second side of the substrate, and the second interval is less than the first interval in width.

10. The capacitive touch sensor of claim 9, wherein two longitudinal edges of the second interval are symmetrical lines.

11. The capacitive touch sensor of claim 10, wherein the two longitudinal edges are straight lines, waved lines or zigzag lines.

12. The capacitive touch sensor of claim 9, wherein a width of the second interval is less than 100 μm.

13. The capacitive touch sensor of claim 9, wherein both the first sensing strings and the second sensing strings are located within the visible area, and the first contacts, the first transmission lines, the first communication contacts, the crossing lines, the second transmission lines and the second communication contacts are located within the shaded area.

14. The capacitive touch sensor of claim 9, wherein the conductive material of the first and second sensing layers is metal oxide or graphene.

15. The capacitive touch sensor of claim 14, wherein the metal oxide is indium tin oxide, indium zinc oxide, aluminum zinc oxide or antimony tin oxide.

16. The capacitive touch sensor of claim 9, wherein the substrate, the cover plate and the cover film are made of glass, polymethyl methacrylate, polycarbonate, polyester, cyclic olefin copolymer or cyclic olefin polymer.

17. The capacitive touch sensor of claim 9, further comprising a function film formed by an anti-fingerprint layer, an atomization film, a hard coating layer, a polarizing film, a retardation film or an optical isotropic film or a lamination of two or more thereof.

* * * * *